X0009518
E. WILBUR.
Feather Renovator.
Patented March 18, 1836.
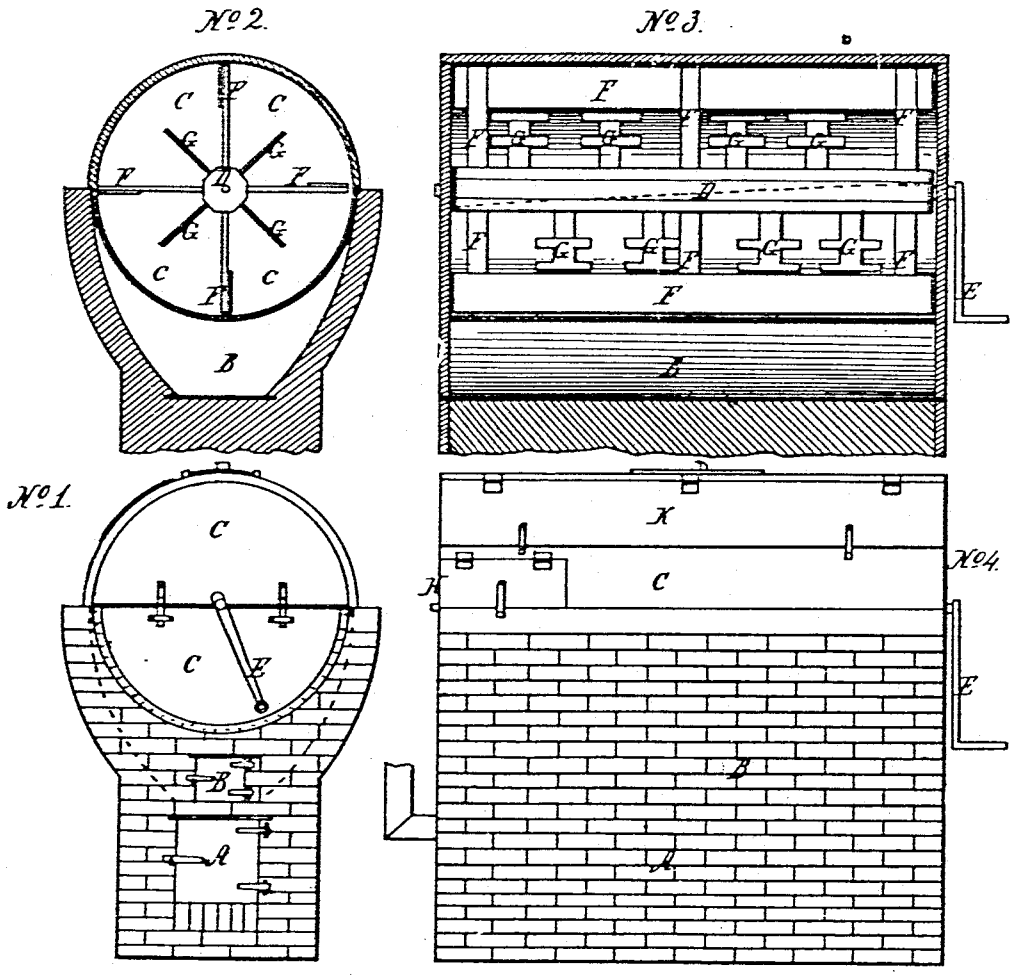
N. PETERS, Photo-Lithographer, Washington, D. C.

United States Patent Office

PTO - BOYERS, PA Duty Station

MISSING PAGE TEMPORARY NOTICE

PATENT # X 9518 FOR ISSUE DATE 3-18-1836

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

all text

Data Conversion Operation

Boyers, Pa